United States Patent
Perez

(10) Patent No.: US 9,984,463 B2
(45) Date of Patent: May 29, 2018

(54) ANALYZING POSTURE-BASED IMAGE DATA

(71) Applicant: United Parcel Service of America, Inc., Atlanta, GA (US)

(72) Inventor: Juan Perez, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 39 days.

(21) Appl. No.: 15/204,417

(22) Filed: Jul. 7, 2016

(65) Prior Publication Data

US 2018/0012357 A1 Jan. 11, 2018

(51) Int. Cl.
*G06K 9/00* (2006.01)
*G06T 7/00* (2017.01)

(52) U.S. Cl.
CPC .......... *G06T 7/0014* (2013.01); *G06T 7/0044* (2013.01); *G06T 2207/30196* (2013.01)

(58) Field of Classification Search
CPC .............. H04N 5/2251; H04N 5/23293; C03B 2225/02; C03B 23/0254; C03B 35/161; C03B 35/163; C03B 35/164
USPC ........................... 382/128; 434/247; 345/633
See application file for complete search history.

(56) References Cited

U.S. PATENT DOCUMENTS

| | | | |
|---|---|---|---|
| 8,550,819 B2 | 10/2013 | Anderson | |
| 9,256,711 B2 * | 2/2016 | Horseman | G06F 19/3418 |
| 2007/0146484 A1 | 6/2007 | Horton et al. | |
| 2014/0127658 A1 * | 5/2014 | Rekimoto | G09B 19/00 434/247 |
| 2014/0278645 A1 | 9/2014 | Davidson et al. | |
| 2015/0039458 A1 | 2/2015 | Reid | |
| 2015/0294262 A1 | 10/2015 | Nelson et al. | |

(Continued)

FOREIGN PATENT DOCUMENTS

EP 2372627 A2 10/2011

OTHER PUBLICATIONS

ISA/220—Notification of Transmittal or Search Report and Written Opinion of the ISA, or the Declaration dated Aug. 4, 2017 for WO Application No. PCT/US17/037603.

*Primary Examiner* — Charlotte M Baker
(74) *Attorney, Agent, or Firm* — Shook, Hardy & Bacon L.L.P.

(57) ABSTRACT

Various embodiments are directed to systems and methods for determining whether an individual uses proper posture to perform a job duty/task. For example, systems may determine whether an individual utilizes proper posture when lifting a heavy item from a floor. Accordingly, various embodiments comprise an image capture device and a central computing entity configured to receive item information/data for an item to be moved by an individual and to determine whether the item information/data satisfies one or more image collection criteria. Upon determining the item information/data satisfies one or more of the image collection criteria, the computing entity may activate an image capture device to collect image information/data of individuals performing the job duty/task, to compare collected image information/data against a plurality of reference images, and to determine whether the collected image information/data is indicative of the individual performing the job duty/task according to proper posture considerations.

20 Claims, 9 Drawing Sheets

(56) References Cited

U.S. PATENT DOCUMENTS

2016/0012545 A1     1/2016   Amigo et al.
2016/0296404 A1* 10/2016   Ota ..................... A61G 7/1017

* cited by examiner

| SHIPMENT INFORMATION: SHIPMENT INFORMATION SEGMENT | | | |
|---|---|---|---|
| Data Element | Field Loc | Field Size | Field Description and Valid Values |
| SegmentIdentifier | 1 | 3 | *BA |
| ShipmentIdentifier | 4 | 35 | 1Z56001003000083767 |
| ConsigneeProfileIdentifier | | | 87EC2020-3AEA-4069-A2DD-08333B30854F |
| ConsignorProfileIdentifier | | | 21EC2020-3AEA-4069-A2DD-08002B30309D |
| PackageCount | 39 | 5 | 1 |
| ShipmentActualWeight | 44 | 17 | 35 |
| AveragePkgWeightInd | 61 | 1 | Set to Space |
| ShipmentDimWeight | 62 | 17 | 0 |
| UOMWeight | 79 | 3 | LBS |
| UPSServiceType | 82 | 2 | 3 |
| ShipmentChgType | 84 | 3 | PRE |
| PaymentMediaTypeCode | 87 | 2 | 10 |
| ConsignorName | 89 | 35 | Set to Spaces |
| DocInd | 124 | 1 | 3 |
| UOMDim | 125 | 2 | IN |
| CurrencyCode | 127 | 3 | USD |
| NumPackagesInShipment | 130 | 6 | 1 |

FIG. 6

| SHIPMENT INFORMATION: ADDRESS INFORMATION SEGMENT | | | |
|---|---|---|---|
| Data Element | Field Loc | Field Size | Field Description and Valid Values |
| SegmentIdentifier | 1 | 3 | *PA |
| AddressQualifier | 4 | 2 | 18 |
| AttnName | 6 | 35 | John Billings |
| CompanyName | 41 | 35 | XYZ Company |
| Address1 | 76 | 35 | 123 Avenue B |
| Address2 | 111 | 35 | Set to Spaces |
| Address3 | 146 | 35 | Set to Spaces |
| City | 181 | 30 | New York |
| StateProv | 211 | 5 | NY |
| PostalCode | 216 | 9 | 10002 |
| Country | 225 | 2 | US |
| PhoneNumber | 227 | 15 | 12125551234 |
| FaxInd | 242 | 1 | Set to Space |
| FaxNumber | 243 | 15 | 12125554321 |
| UPSAccountNumber | 258 | 10 | Set to Spaces |
| TaxID | 268 | 15 | Set to Spaces |

FIG. 7

| SHIPMENT INFORMATION: NOTIFICATION INFORMATION SEGMENT | | | |
|---|---|---|---|
| Data Element | Field Loc | Field Size | Field Description and Valid Values |
| SegmentIdentifier | 1 | 3 | *GA |
| RequestTypeCode | 4 | 3 | 6 |
| MediaTypeCode | 7 | 2 | 3 |
| RequestTypeEmailAddress | 9 | 50 | email_address@email.com |
| RequestTypeLanguageCode | 59 | 3 | Set to Spaces |
| RequestTypeDialect | 62 | 2 | Set to Spaces |
| SentFromName | 64 | 35 | Set to Spaces |
| ReplyToEmailAddress | 99 | 50 | Set to Spaces |
| FailureEmailAddress | 149 | 50 | Set to Spaces |
| FAXDestinationInd | 199 | 1 | Set to Space |
| DestinationFaxNumber | 200 | 15 | Set to Spaces |
| CompanyName | 215 | 35 | Set to Spaces |
| AttnName | 250 | 35 | Set to Spaces |
| Phone | 285 | 15 | Set to Spaces |
| SubjectCode | 300 | 2 | 1 |
| SubjectText | 302 | 75 | Set to Spaces |

FIG. 8

ANALYZING POSTURE-BASED IMAGE DATA

BACKGROUND

As the negative health benefits of improper posture become more apparent, particularly when persons lift heavy objects, entities are frequently seeking to ensure that personnel (e.g., individuals) are utilizing proper posture while performing assigned job duties. However, because individuals are often required to perform various job duties without oversight of supervisory personnel who may be trained to ensure that individuals are utilizing proper posture when performing various job duties, entities are often unaware of whether their personnel are following recommended posture training while performing their daily job duties.

Moreover, individuals are often required to perform several job duties, each having distinct proper posture considerations. For example, lifting a heavy object off of a floor may have a respective set of posture considerations (e.g., maintaining a flat back and lifting using the individual's leg muscles) and carrying a heavy object from a vehicle may have a different respective set of posture considerations (e.g., placing the object on the floor of the vehicle proximate an exit opening, and lifting the shipment/item off of the floor of the vehicle while the individual is outside of the vehicle).

Accordingly, a need exists for systems and methods for automatically identifying proper posture based on an individual's activities and for determining whether the individual is following proper posture considerations.

BRIEF SUMMARY

Various embodiments are directed to systems and methods for determining whether an individual utilizes proper posture to perform one or more job duties. According to the concepts discussed herein, individuals who are unnecessarily increasing their risk of injury by improperly performing various job duties may be identified, such that these individuals may be properly trained to perform their job duties while minimizing the possibility of preventable bodily injury.

Accordingly, various embodiments are directed to a system for analyzing an activity performed by an individual while the individual performs one or more duties. The system may comprise one or more image capture devices and a central server in communication with the one or more image capture devices. The central server may comprise one or more non-transitory memory storage areas and one or more processors, collectively configured to receive item data for an item indicating the item is to be moved, wherein the item data comprises data indicative of one or more characteristics of the item and the location of the item; and determine whether the item data satisfies image collection criteria. Upon determining the item data satisfies one or more image collection criteria, the central server may be configured to provide an indication to one or more of the image capture devices to collect image data of an individual performing a job duty/task; retrieve one or more reference images identified as reflecting either a proper posture or an improper posture; compare one or more images of the collected image data to one or more of the reference images to identify a reference image corresponding to the collected image data. Upon identifying a reference image corresponding to the collected image data, the central server may be configured to determine whether the identified reference image reflects a proper posture or an improper posture, and upon determining that the identified reference image reflects an improper posture, cause a separate user device to generate a report indicating the individual improperly performed a job duty/task. Upon determining that the collected image data does not correspond to any of the one or more reference images identified as reflecting a proper posture, the central server may be configured to cause the separate user device to generate a report indicating the individual improperly performed the job duty/task.

In various embodiments, comparing the collected image data against one or more of the reference images comprises overlying the captured image data and each of the plurality of reference images to identify matching attributes of the captured image data and each of the plurality of reference images. Moreover, providing an indication to one or more of the image capture devices may comprise selecting an appropriate image capture device located proximate the location of the item and configured to capture image data of an individual moving the item; and transmitting an activation signal to the appropriate image capture device to cause the image capture device to begin capturing image data.

Moreover, in various embodiments, the central server is configured to select the appropriate image capture device and to transmit the activation signal to the appropriate image capture device in real time. In certain embodiments, the central server is located geographically remotely from the one or more image capture devices.

Moreover, in various embodiments, the one or more characteristics of the item comprises data indicative of one or more dimensions of the item. In certain embodiments, the image collection criteria identifies a minimum dimension for the item for capturing image data. The minimum dimension may comprise a minimum item weight.

Moreover, in various embodiments, the item data is received from a handheld computing entity scanning an item identifier associated with the item, and wherein the location of the item is determined based on the location of the handheld computing entity.

In certain embodiments, the reference images identified as reflecting a proper posture for performing the job duty/task show proper tools for performing the job duty/task.

Certain embodiments are directed to a method for analyzing an activity performed by an individual while the individual performs one or more duties. The method may comprise steps for: receiving item data for an item indicating the item is to be moved, wherein the item data comprises data indicative of one or more characteristics of the item and the location of the item; determining whether the item data satisfies image collection criteria; upon determining the item data satisfies image collection criteria, provide an indication to one or more image capture devices to collect image data of an individual performing a job duty/task; retrieving one or more reference images identified as reflecting either a proper posture or an improper posture; comparing one or more images of the collected image data to one or more of the reference images to identify a reference image corresponding to the collected image data; upon identifying a reference image corresponding to the collected image data, determining whether the identified reference image reflects a proper posture or an improper posture; upon determining that the identified reference image reflects an improper posture, causing a separate user device to generate a report indicting the individual improperly performed a job duty/task; and upon determining that the collected image data does not correspond to any of the one or more reference images identified as reflecting a proper posture, causing the separate user device to generate a report indicating the individual improperly performed the job duty/task.

In certain embodiments, steps for comparing the collected image data against one or more of the reference images comprises overlying the captured image data and each of the plurality of reference images to identify matching attributes of the captured image data and each of the plurality of reference images. Moreover, providing an indication to one or more of the image capture devices may comprise steps for: selecting an appropriate image capture device located proximate the location of the item and configured to capture image data of an individual moving the item; and transmitting an activation signal to the appropriate image capture device to cause the image capture device to begin capturing image data. In various embodiments, the steps for selecting an appropriate image capture device and for transmitting an activation signal to the appropriate image capture device are performed in real time.

In various embodiments, the one or more characteristics of the item comprises data indicative of one or more dimensions of the item. Moreover, the one or more image collection criteria may identify a minimum dimension (such as a minimum weight) for capturing image data.

In various embodiments, receiving the item data comprises steps for: scanning an item identifier associated with the item via a handheld computing entity; determining the location of the handheld computing entity; and associating the determined location of the handheld computing entity with the location of the item.

Moreover, in various embodiments, the item data is received from a handheld computing entity scanning an item identifier associated with the item, and wherein the location of the item is determined based on the location of the handheld computing entity.

Various embodiments are directed to a computer program product comprising at least one non-transitory computer-readable storage medium having computer-readable program code portions stored therein. In various embodiments, the computer-readable program code portions comprise: an executable portion configured to receive item data for an item indicating the item is to be moved, wherein the item data comprises data indicative of one or more characteristics of the item and the location of the item; an executable portion configured to determine whether the item data satisfies image collection criteria; an executable portion configured to, upon determining the item data satisfies image collection criteria, provide an indication to one or more of the image capture devices to collect image data of an individual performing a job duty/task; an executable portion configured to retrieve one or more reference images identified as reflecting either a proper posture or an improper posture; an executable portion configured to compare one or more images of the collected image data to one or more of the reference images to identify a reference image corresponding to the collected image data; an executable portion configured to, upon identifying a reference image corresponding to the collected image data, determine whether the identified reference image reflects a proper posture or an improper posture; an executable portion configured to, upon determining that the identified reference image reflects an improper posture, cause a separate user device to generate a report indicating the individual improperly performed a job duty/task; and an executable portion configured to, upon determining that the collected image data does not correspond to any of the one or more reference images identified as reflecting a proper posture, cause the separate user device to generate a report indicating the individual improperly performed the job duty/task.

BRIEF DESCRIPTION OF THE SEVERAL VIEWS OF THE DRAWINGS

Reference will now be made to the accompanying drawings, which are not necessarily drawn to scale, and wherein:

FIGS. 6-8 illustrate example shipment/item information/data that may be included in a Package Level Detail ("PLD") database.

DETAILED DESCRIPTION

Figure 1:
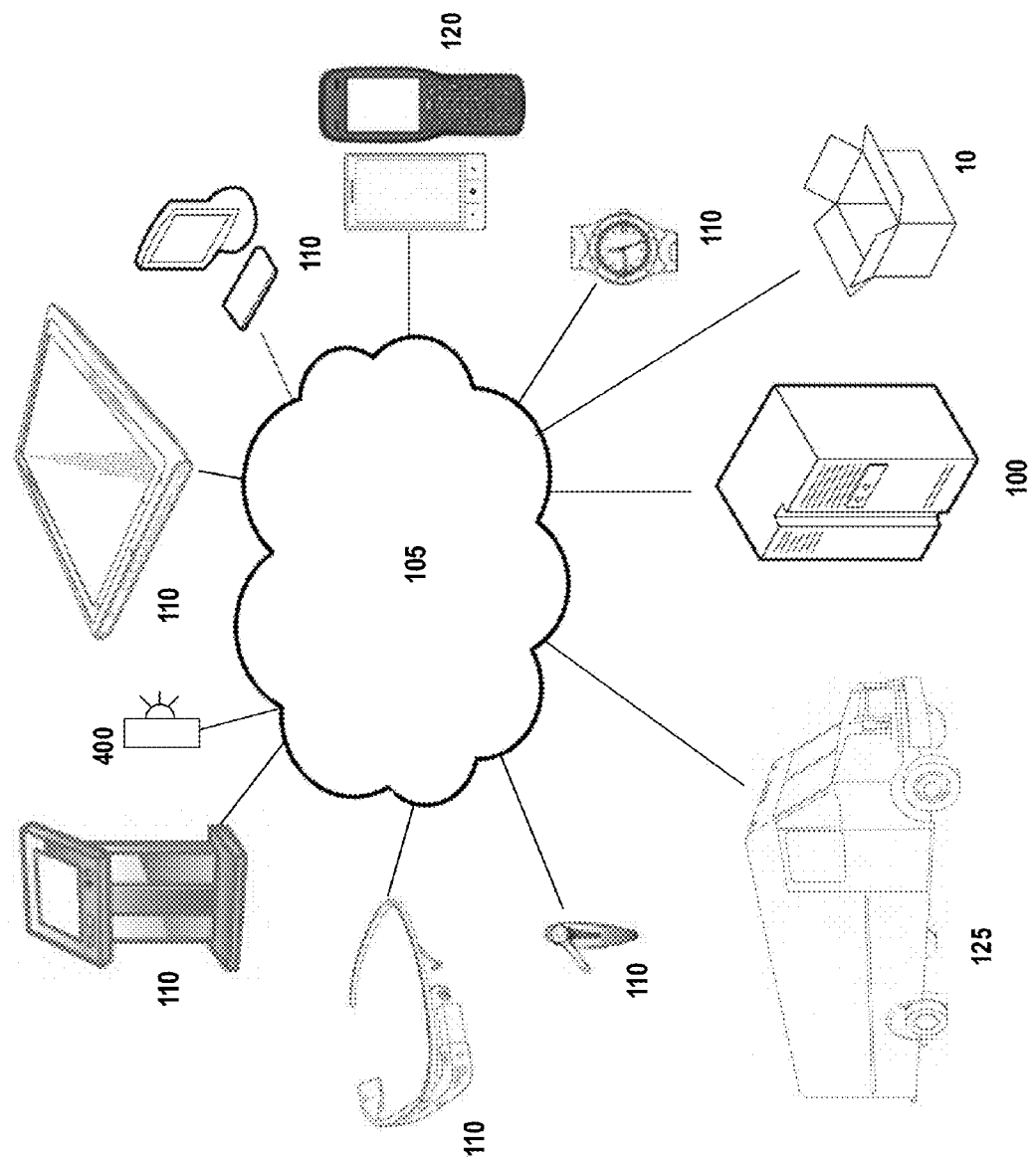
FIG. 1 shows a communications network between various computing entities according to various embodiments of the present invention.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments provide systems and methods for ensuring that personnel (e.g., individuals) are utilizing proper posture when performing various job duties, and for informing supervisory personnel if individuals are determined to utilize improper posture for various job duties. For example, personnel of carriers, who are required to lift and/or maneuver shipments/items (discussed in detail herein) may be required to perform job duties that may subject the personnel to a risk of injury if the job duty/task is performed using an improper posture. Lifting heavy shipments/items from a floor and/or a low shelf, retrieving shipments/items from a high shelf and/or storage location, and/or the like may be associated with particular posture that minimizes the risk of injury to the individual performing the job duty/task.

As used herein, an individual's posture may refer to the individual's body positioning during a particular activity. In various embodiments, the individual's body positioning may be impacted by one or more tools (e.g., a ladder, fork lift, wrench, hammer, axe, and/or the like) utilized by the individual. Accordingly, as discussed herein, determining whether an individual is utilizing a proper posture during a job duty/task may be indicative of whether an individual is utilizing a proper tool to complete the job duty/task. For example, an employer may indicate that employees are required to utilize a ladder to retrieve shipments/items from shelves above the employee's head. Accordingly, a determination that the employee stretches significantly in order to reach and retrieve a shipment/item from overhead, without utilizing a ladder, may be indicative that the employee did not utilize proper tools to retrieve the shipment/item. As yet another example, an employer may specify that employees are required to utilize an 18"-long torque wrench to tighten certain bolts. Accordingly, a determination that both of an individual's hands are less than 18" away from a bolt while tightening the bolt may indicate that the employee is utilizing an improperly-sized wrench.

Determinations of whether individuals are utilizing proper posture are made automatically by one or more computing entities, based on a comparison between image information/data captured while an individual is performing a particular job duty/task and a database of reference images providing examples of proper and/or improper posture for performing various job duties.

However, identifying a reference image of a plurality of reference images corresponding to a particular captured image may be a highly computer-intensive process, particularly in embodiments in which a database of reference images comprises a large number of reference images. Accordingly, various embodiments retrieve information/data indicative of a job duty/task to be performed prior to capturing image information/data of an individual performing the particular job duty/task. For example, a computing entity may receive shipment/item information/data corresponding to a shipment/item to be lifted and/or moved and/or location information/data indicative of the location where the shipment/item is being lifted and/or moved. The computing entity may determine whether the job duty/task is associated with inherent risks of injury based on the received information/data (e.g., by comparing a weight of a shipment/item to be lifted against a threshold weight), and may only activate image capture devices upon a determination that the job duty/task is associated with inherent injury risks. Accordingly, computing entities need only perform image analysis for images captured of individuals performing job duties associated with a risk of injury.

The captured image information/data may comprise one or more still-frame images captured at one or more instances while the individual is performing the job duty/task, and/or one or more multi-frame videos captured while the individual is performing the job duty/task.

Moreover, prior to performing a comparison between captured image information/data and the plurality of reference images, the computing entity may filter the plurality of reference images, such that the comparison step is performed considering only relevant reference images. For example, the computing entity may identify a likely job duty/task to be performed based on the collected shipment/item information/data and the collected location information/data (e.g., which may indicate that a 50 lb. shipment/item to be lifted and delivered from within a delivery vehicle is positioned on a bottom shelf of the vehicle), and may filter the reference images such that only reference images corresponding to the identified job duty/task are utilized during the comparison.

Based on the results of the comparison, the computing entity may determine whether the individual performed the job duty/task in accordance with applicable posture considerations. For example, the computing entity may determine whether the captured image information/data is most similar to images of individuals properly performing the job duty/task, or images of individuals improperly performing the job duty/task. Upon a determination that the individual did not properly perform the job duty/task, the computing entity may cause one or more additional handheld devices to generate an alert indicative of the improperly performed job duty/task. In various embodiments, the alerts may comprise the captured image information/data and one or more determined reference images deemed most similar to the captured image information/data. Moreover, the alert may provide a description of proper posture considerations applicable to the determined job duty/task performed. In various embodiments, the computing entity may cause the alerts to be generated by a computing entity associated with the individual, the individual's supervisor, and/or the like.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an exemplary embodiment of the present invention. As shown in FIG. 1, this particular embodiment may include one or more carrier computing entities 100, one or more networks 105, one or more user computing entities 110, one or more handheld computing entities 120, one or more vehicles 125, one or more image capture devices 400, and/or one or more shipments/items 10. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Carrier Computing Entities

Figure 2:
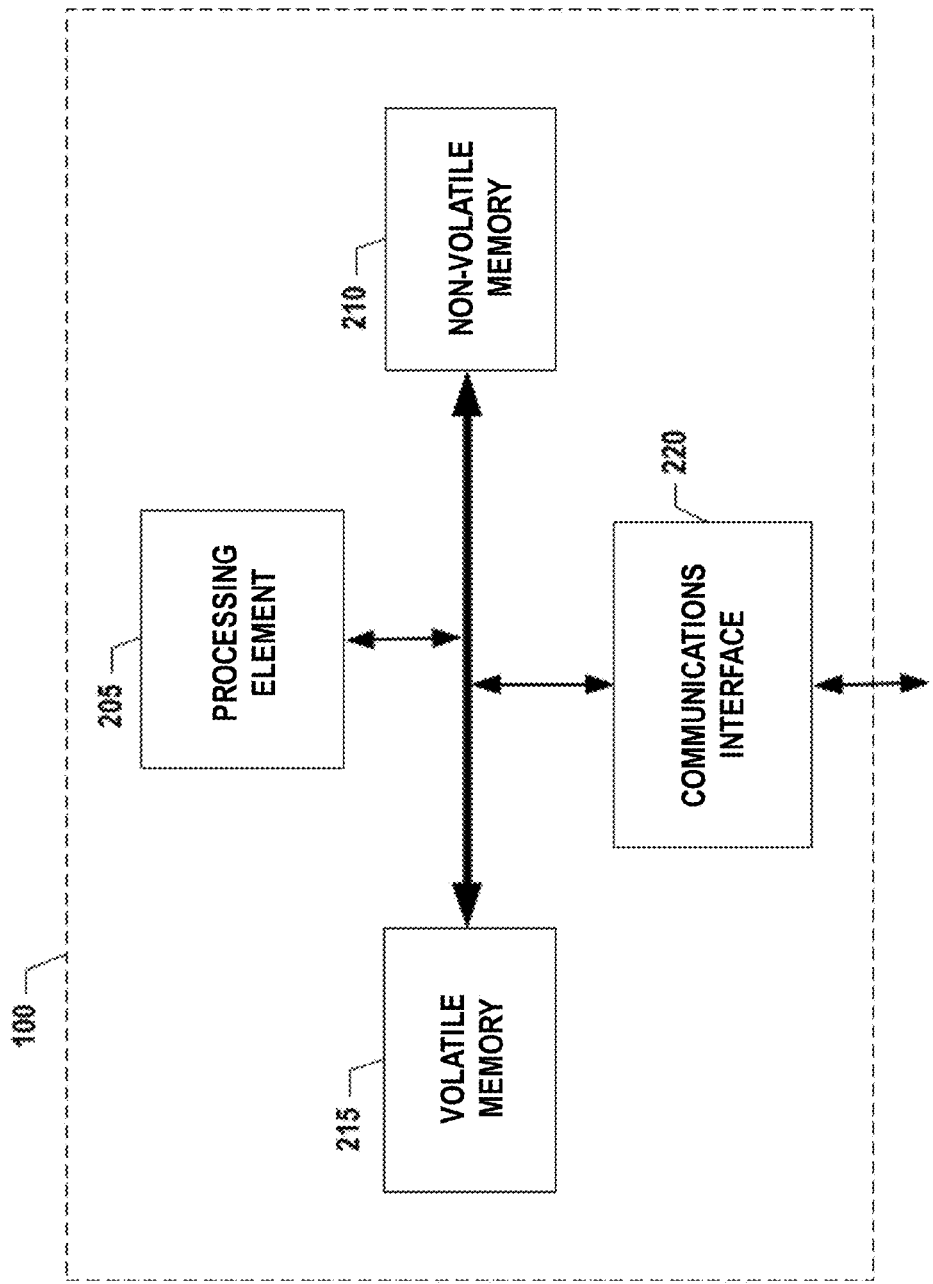
FIG. 2 shows example components of a carrier computing entity according to various embodiments of the present invention.

FIG. 2 provides a schematic of a carrier computing entity 100 according to one embodiment of the present invention. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Coyote, Amazon, Google, Uber, ride-sharing services, crowd-sourcing services, retailers, and/or the like.

In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/ or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the carrier computing entity 100 may include or be in communication with one or more processing elements 205 (also referred to as processors, processing circuitry, and/or similar terms used herein interchangeably) that communicate with other elements within the carrier computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., shipment/item database 40), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the carrier computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier computing entity 100 with the assistance of the processing element 205 and operating system.

As indicated, in one embodiment, the carrier computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the carrier computing entity 100 may include or be in communication with one or more input elements, such as a keyboard input, a mouse input, a touch screen/display input, motion input, movement input, audio input, pointing device input, joystick input, keypad input, and/or the like. The carrier computing entity 100 may also include or be in communication with one or more output elements (not shown), such as audio output, video output, screen/display output, motion output, movement output, and/or the like.

As will be appreciated, one or more of the carrier computing entity's 100 components may be located remotely from other carrier computing entity 100 components, such as in a distributed system. Furthermore, one or more of the components may be combined and additional components performing functions described herein may be included in the carrier computing entity 100. Thus, the carrier computing entity 100 can be adapted to accommodate a variety of needs and circumstances. As will be recognized, these architectures and descriptions are provided for exemplary purposes only and are not limiting to the various embodiments.

2. Exemplary User Computing Entities

Figure 3:
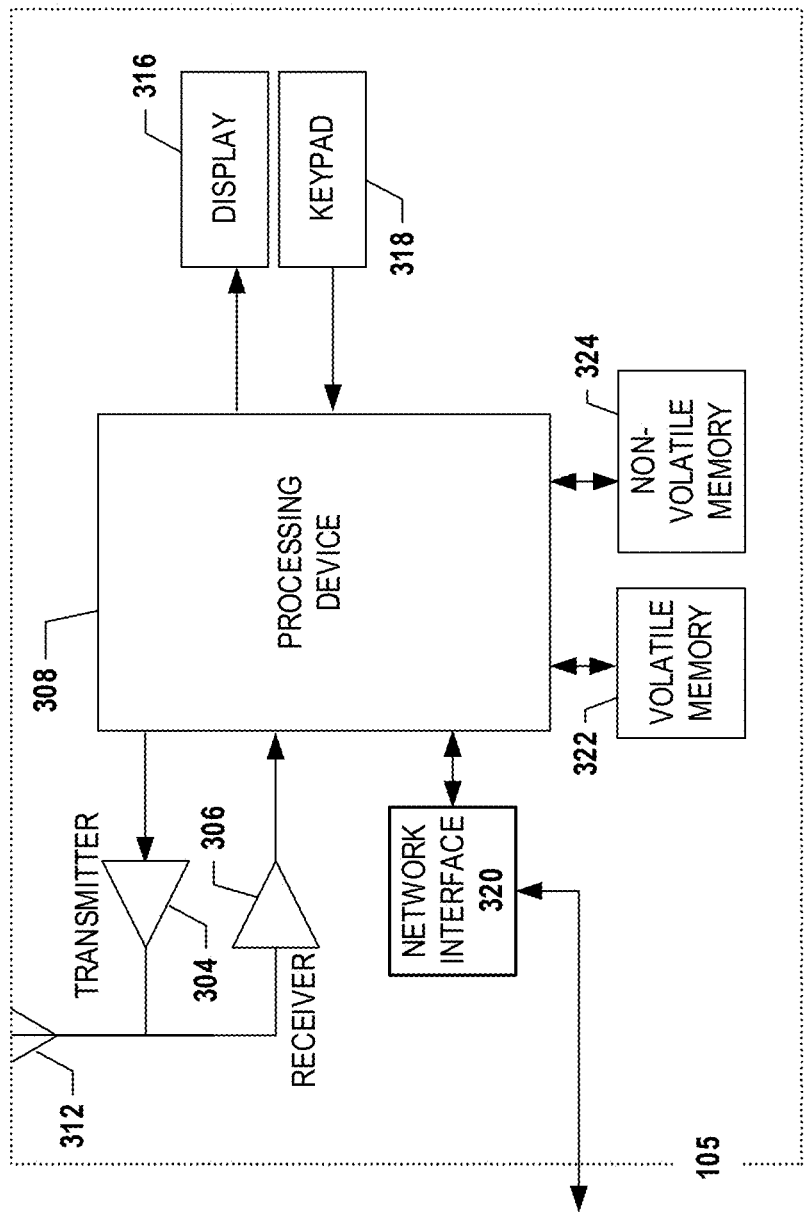
FIG. 3 shows example components of a user computing entity according to various embodiments of the present invention.

A user may be an individual, a family, a company, an organization, an entity, a department within an organization, a representative of an organization (e.g., an employee), and/or person, and/or the like—whether or not associated with a carrier. To do so, a user may operate a user computing entity 110 that may include one or more components that are functionally similar to those of the carrier computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties, including carrier personnel (sorters, loaders, delivery drivers, network administrators, and/or the like). As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the carrier computing entity 100. In a particular embodiment, the user computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the carrier computing entity 100 via a network interface 320.

Via these communication standards and protocols, the user computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the carrier computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the carrier computing entity 100 and/or various other computing entities.

In another embodiment, the user computing entity 110 may include one or more components or functionality that are the same or similar to those of the carrier computing entity 100, as described in greater detail above. As will be recognized, these architectures and descriptions are provided for exemplary purposes only and are not limiting to the various embodiments.

3. Exemplary Mobile Device

The mobile device 120 may each include one or more components that are functionally similar to those of the carrier computing entity 100 and/or user computing entity 110. For example, in one embodiment, each of the mobile devices may include: (1) a processor that communicates with other elements via a system interface or bus; (2) a display device/input device; (3) transitory and non-transitory memory; and (4) a communications interface. These architectures are provided for exemplary purposes only and are not limiting to the various embodiments. The terms "device" and "computing device" are used in this regard generically to refer to any computer, computing device, desktop, notebook computer, laptop computer, distributed system, carrier system, gateway, switch, or other processing device adapted to perform the functions described herein.

Moreover, in various embodiments, a mobile device 120 may comprise an indicia scanner for retrieving shipment/item information/data from a scanned item. For example, the indicia scanner may comprise a bar-code scanner, a camera, an RFID tag reader, and/or the like. The indicia scanner may be configured to retrieve computer-readable information/data from a shipment/item identifier associated with a shipment/item (e.g., printed on the shipment/item, positioned within the shipment/item, and/or the like). As discussed herein, the shipment/item identifier may be utilized to retrieve additional shipment/item information/data corresponding to the particular shipment/item from a database or other information/data storage location. In certain embodiments, the shipment/item identifier may itself comprise additional information/data regarding the item, such as information/data indicative of one or more dimensions of the shipment/item (e.g., a length, width, height, weight, and/or the like), information/data indicative of various assigned characteristics of the shipment/item (e.g., fragile), and/or the like.

4. Exemplary Image Capture Devices

As discussed herein, one or more image capture devices 400 may be positioned proximate one or more work areas such that a field of view (FOV) or fields or view (FOVs) associated with each of the image capture devices 400 encompasses at least a portion of a work area in which personnel are expected to perform one or more job duties. In various embodiments, an image capture device 400 comprises a lens through which image data is captured for the FOV.

In various embodiments, an image capture device 400 may have a plurality of FOVs, such that a single image capture device 400 may be utilized to record personnel activities in a plurality of work areas. For example, an image capture device 400 may have two FOVs, each positioned on opposite sides of the image capture device 400. In such embodiments, the image capture device 400 may comprise two lens through which the image capture device 400 records image data. The lenses may be positioned on corresponding sides of the image capture device 400. As yet another alternative, the image capture device 400 may be configured for 360 degree viewing (e.g., having a FOV that encircles the image capture device 400). In various embodiments, the FOV may comprise a ring around the image capture device, such that the FOV does not extend around the image capture device 400. However, in certain alternatives, the image capture device may comprise a complete or nearly complete FOV that extends at least substantially around the image capture device 400 in all directions (e.g., in all directions and in all dimensions). In various embodiments, the image capture device 400 may comprise a plurality of lens that each collect data for a portion of the FOV of the image capture device 400. In such embodiments, the image capture device 400 (and/or a remotely located computing device) may be configured to stitch together the image data captured through each of the plurality of lenses to provide image data indicative of the complete FOV of the image capture device. For example, the data collected through each of the plurality of lenses may be stitched together by identifying common portions of the image data collected from adjacent lenses, and overlying the common portions of the image data to provide a reference between data collected through each of the plurality of lenses.

As non-limiting examples, various image capture devices 400 may comprise still-frame cameras, video cameras (e.g., low-resolution video cameras, high-resolution video cameras, and/or the like), and/or the like to capture image information/data. The image information/data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, VP8, and/or the like. In one embodiment, each frame or image captured can be time stamped and/or coded with location information/data. Further, the image capture devices 400 may include or be used in association with various lighting, such as light emitting diodes (LEDs), Infrared lights, array lights, strobe lights, and/or other lighting mechanisms to sufficiently illuminate the one or more FOV to capture image information/data for analysis.

In various embodiments, the one or more image capture devices 400 may comprise an antenna, a transmitter (e.g., a radio), a receiver (e.g., a radio), and a processing element that provides signals to and receives signals from the transmitter and receiver, respectively. Accordingly, image capture devices 400 may comprise one or more components that are functionally similar to the above-described user computing entities 110.

The signals provided to and received from the transmitter and the receiver, respectively, may include signaling information in accordance with air interface standards of applicable wireless systems. In this regard, the one or more image capture devices 400 may be capable of operating with one or more air interface standards, communication protocols, modulation types, and access types. More particularly, the one or more image capture devices 400 may operate in accordance with any of a number of wireless communication standards and protocols, such as those described above with regard to the carrier computing entity 100. In a particular embodiment, the one or more image capture devices 400 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the one or more image capture devices 400 may operate in accordance with multiple wired communication standards and protocols, such as those described above with regard to the carrier computing entity 100 via a network interface.

Via these communication standards and protocols, the one or more image capture devices 400 can communicate with various other entities. For example, the one or more image capture devices 400 may be configured to receive signals causing the image capture devices 400 to capture one or more images and to generate signals comprising image information/data captured during one or more image capture events. Moreover, in various embodiments, the one or more image capture devices 400 may be configured to receive signals that cause the image capture device 400 to transition between one of a plurality of operating modes, such as between a low-power, "standby" mode and an active mode. For example, one or more image capture devices 400 may be configured to receive a signal from a carrier computing entity 100 causing the image capture devices 400 to switch from a standby mode to an active mode and to capture image information/data upon becoming active.

In various embodiments, the one or more image capture devices may be configured to capture image information/data (e.g., still images and/or video) upon the occurrence of an image capture trigger event. An image capture trigger event may be detected directly by the image capture device 400, and/or the image capture device 400 may receive information/data indicative of the occurrence of an image capture trigger event from one or more other computing entities (e.g., carrier computing entity 100, user computing entity 110), and/or mobile computing entity 120). For example, an image capture trigger event may be receipt of an image capture signal, sensing an individual within the FOV of the image capture device 400, and/or the like.

In various embodiments, the one or more image capture devices 400 may additionally comprise one or more sensors configured to sense when individuals are performing one or more job duties within the FOV of the image capture device. The sensors may each have an associated sensor FOV within which the sensors are configured for detecting various attributes. In various embodiments, the sensor FOV may coincide with the FOV of the image capture device 400, such that the sensors are configured to detect individuals within the FOV of the image capture device 400. For example, the one or more sensors may comprise an infrared sensor configured to detect the presence of a person within the FOV of the image capture device 400, a movement sensor configured to detect movement within the FOV of the image capture device 400, and/or the like. Accordingly, the one or more image capture devices 400 may be configured to capture image information/data upon one of more sensors detecting the occurrence of a trigger event, such as the detection of the presence of an individual within the FOV of the image capture device 400. However, as noted above, image capture devices 400 may be configured to begin image information/data collection in response to any of a variety of trigger events. As mentioned, these trigger events may be sensed by sensors of the image capture devices 400, however the trigger events may be sensed and/or performed by one or more other computing entities in communication with the one or more image capture devices 400. For example, a trigger event may comprise the receipt of a signal from one or more computing entities requesting the image capture device 400 to begin capturing image information/data.

The image capture devices 400 may be configured to continue capturing image information/data until receipt of information/data indicative of the occurrence of a termination event. For example, the image capture devices 400 may be configured to continuously capture video information/data or to capture still image information/data periodically, continuously, and/or the like. In various embodiments, a termination event may be identified as the receipt of information/data instructing the image capture device 400 to terminate image capture, the end of a predefined image capture time period (e.g., 5 seconds), and/or the like.

As mentioned, the image capture devices 400 may be positioned proximate one or more work areas such that the FOV of the image capture devices 400 encompass at least a portion of a work area in which individuals are expected to perform job duties. For example, image capture devices 400 may be positioned proximate shipment/item sort locations where shipments/items are removed from conveying mechanisms and moved to appropriate sort locations (e.g., shipment/item delivery vehicles).

Figure 4:
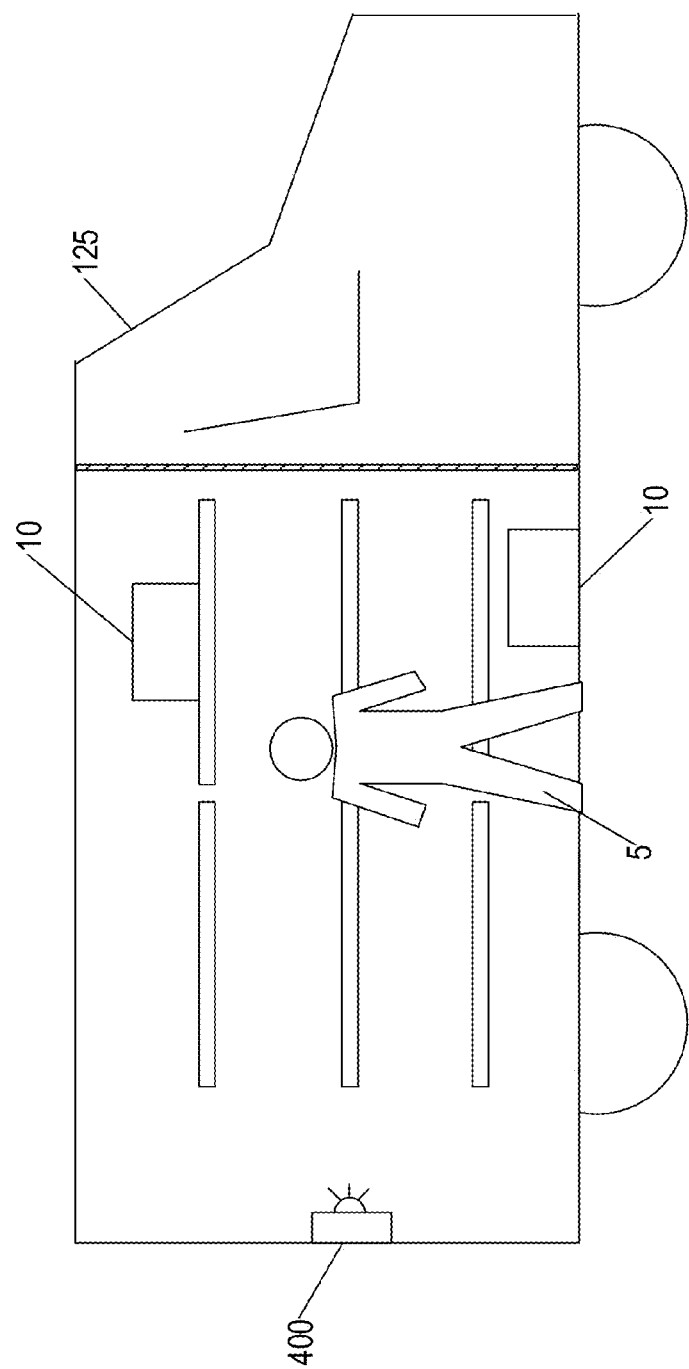
FIG. 4 shows an example placement of an image capture device according to various embodiments of the present invention.

FIG. 4 illustrates yet another example, in which one or more image capture devices 400 are positioned in and/or on shipment/item delivery vehicles 125 (e.g., within a cargo area of a shipment/item delivery vehicle 125) such that images of individuals 5 removing shipments/items 10 from the shipment/item delivery vehicle 125 may be captured.

In various embodiments, the image capture devices 400 may be positioned relative to a corresponding work area (e.g., the interior of a shipment/item delivery vehicle 125) to capture images reflective of various attributes of an individual's posture while performing various job duties. The positioning of the image capture devices 400 may be selected based at least in part on the job duties to be performed in the corresponding work area. For example, in a shipment/item delivery vehicle 125 in which shipments/items 10 are expected to be lifted off of the floor of the vehicle and off of shelves at various altitudes within the vehicle 125, the image capture device 400 may be positioned at a side of the work area, with the FOV of the image capture device 400 being at least substantially perpendicular to an expected orientation of individuals 5 when lifting shipments/items 10 off of the floor or one or more of the shelves. As a more specific example, in the cargo area of a shipment/item delivery vehicle 125 which defines a substantially linear walkway between shipment/item storage shelves on opposite sides of the walkway, an image capture device 400 may be positioned at an end of the walkway, at least substantially centered between the floor and ceiling, and the side-walls of the cargo area, as shown in FIG. 4. In such a configuration, individuals 5 unloading shipments/items 10 from the shipment/item delivery vehicle 125 may be expected to face perpendicular to the walkway when lifting shipments/items 10 from the floor and/or a storage shelf. In such a configuration, the image capture device 400 is likely to capture image information/data that may be utilized to determine whether the individual's back is flat while lifting a shipment/item 10 from the floor of the vehicle 125.

In various embodiments, image capture devices 400 may store device location information/data and may make this information available to various other computing entities, for example, in response to device location information/data inquiries. In various embodiments, the device location information/data may comprise information/data indicative of the location of the image capture device 400 (e.g., Vehicle 1234; Sort Station 5678; and/or the like); information/data indicative of the portion of the corresponding work area encompassed by the FOV of the image capture device 400 (e.g., Rear-half of Cargo Area—Vehicle 1234; Conveyor belt—Sort Station 5678; and/or the like); and/or the like. Accordingly, as will be discussed in greater detail herein, one or more computing entities (e.g., carrier computing entity 100) may be configured to transmit a signal to an appropriate image capture device 400 upon receipt of information/data indicating that image information/data should be captured of an individual 5 performing one or more job duties.

5. Exemplary Shipment/Item

In one embodiment, a shipment/item 10 may be any tangible and/or physical object. In one embodiment, a shipment/item 10 may be or be enclosed in one or more packages, envelopes, parcels, bags, goods, products, containers, loads, crates, items banded together, vehicle parts, pallets, drums, the like, and/or similar words used herein interchangeably. In one embodiment, each shipment/item 10 may include and/or be associated with a shipment/item information/data. Some exemplary shipment/item information/data is shown in FIGS. 6, 7, and 8. For example, the shipment/item information/data may comprise data identifying a shipment/item weight (and/or other dimensions), an origin location for the shipment/item (e.g., an origin address), a destination location for the shipment/item (e.g., a destination address), a service level for the shipment/item, correspondence information for the shipment/item (e.g., an email address, a fax number, a telephone number, and/or the like. As will be recognized, the shipment/item information/data may include a shipment/item identifier, such as an alphanumeric identifier. Such shipment/item identifiers may be represented as text, barcodes, tags, character strings, Aztec Codes, MaxiCodes, information/data Matrices, Quick Response (QR) Codes, electronic representations, and/or the like. A unique shipment/item identifier (e.g., 123456789) may be used by the carrier to identify and track the shipment/item 10 as it moves through the carrier's transportation network. Further, such shipment/item identifiers can be affixed to shipments/items 10 by, for example, using a sticker (e.g., label) with the unique shipment/item identifier printed thereon (in human and/or machine readable form) or an RFID tag with the unique shipment/item identifier stored therein. Such items may be referred to as "connected" shipments/items and/or "non-connected" shipments/items.

In one embodiment, connected shipments/items 10 include the ability to determine their locations and/or communicate with various computing entities. This may include the shipment/item 10 being able to communicate via a chip or other devices, such as an integrated circuit chip, RFID technology, Near Field Communication (NFC) technology, Bluetooth technology, Wi-Fi technology, and any other suitable communication techniques, standards, or protocols with one another and/or communicate with various computing entities for a variety of purposes. Connected shipments/items 10 may include one or more components that are functionally similar to those of the carrier server 100 and/or the mobile device 110 as described herein. For example, in one embodiment, each connected shipment/item 10 may include one or more processing elements, one or more display device/input devices (e.g., including user interfaces), volatile and non-volatile storage or memory, and/or one or more communications interfaces. In this regard, in some example embodiments, a shipment/item 10 may communicate send "to" address information/data, received "from" address information/data, unique identifier codes, location information/data/data, status information/data, and/or various other information/data.

In one embodiment, non-connected shipments/items 10 do not typically include the ability to determine their locations and/or might not be able communicate with various computing entities or are not designated to do so by the carrier. The location of non-connected shipments/items 10 can be determined with the aid of other appropriate computing entities. For example, non-connected shipments/items 10 can be scanned (e.g., affixed barcodes, RFID tags, and/or the like) or have the containers or vehicles 125 in which they are located scanned or located. As will be recognized, an actual scan or location determination of a shipment/item 10 is not necessarily required to determine the location of a shipment/item 10. That is, a scanning operation might not actually be performed on a label affixed directly to a shipment/item 10 or location determination might not be made specifically for or by a shipment/item 10. For example, a label on a larger container housing many shipments/items 10 can be scanned, and by association, the location of the shipments/items 10 housed within the container are considered to be located in the container at the scanned location. Similarly, the location of a vehicle 125 transporting many shipments/items 10 can be determined, and by association, the location of the shipments/items 10 being transported by the vehicle 125 are considered to be located in the vehicle 125 at the determined location. These can be referred to as "logical" scans/determinations or "virtual" scans/determinations. Thus, the location of the shipments/items 10 is based on the assumption they are within the container or vehicle 125, despite the fact that one or more of such shipments/items 10 might not actually be there.

III. Exemplary System Operation

In various embodiments, image information/data may be collected automatically upon determining that individuals 5 are likely to perform one or more job duties having one or more posture considerations, such that the image information/data may be reviewed to determine whether the individuals properly performed the job duties.

Figure 5:
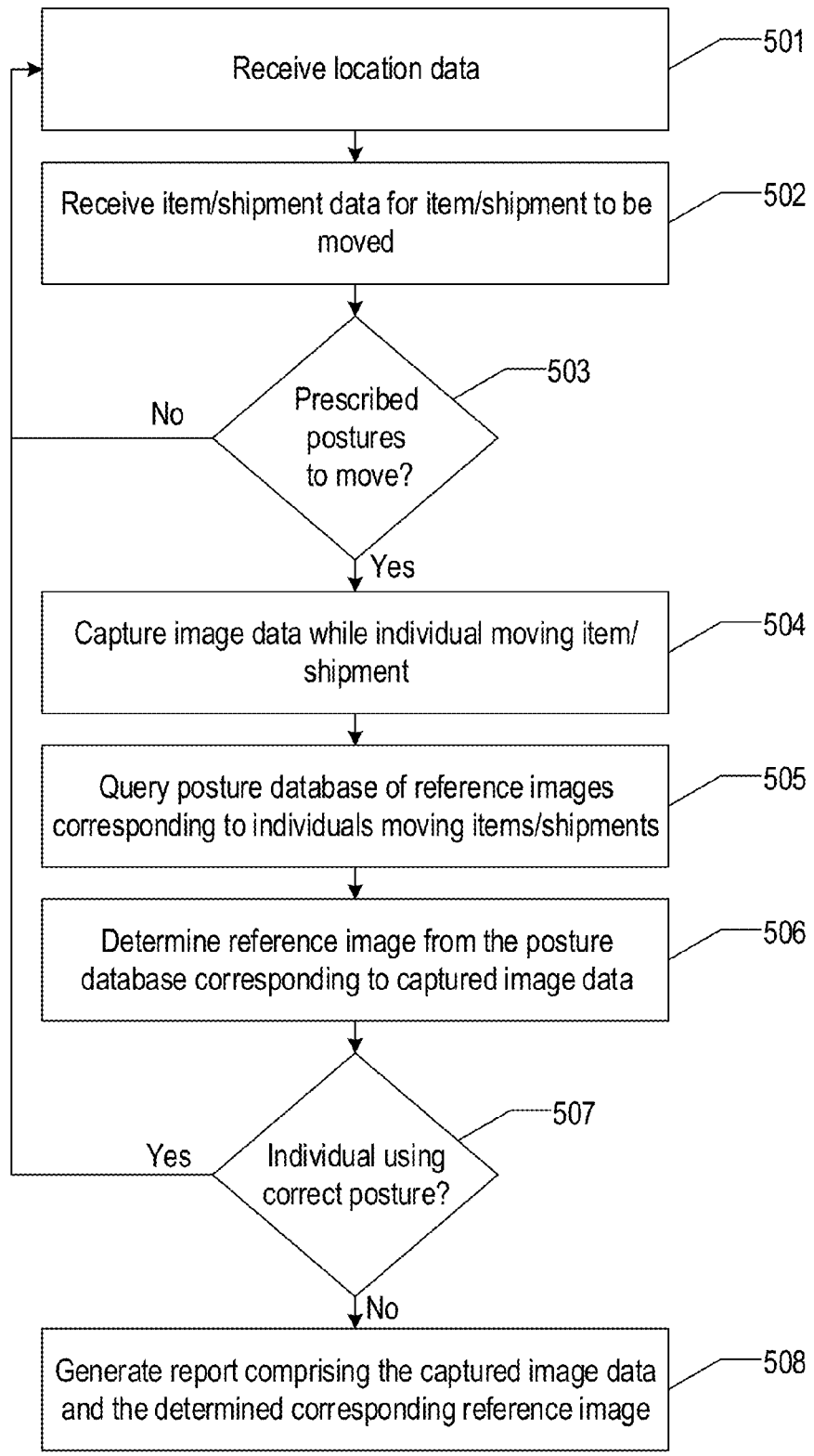
FIG. 5 is a flowchart showing various processes in determining whether an individual performs a job duty/task according to the proper posture.

With reference to FIG. 5, in one embodiment, the process encompasses steps in which the carrier computing entity 100 receives location information/data indicative of a location where one or more job duties are to be performed, as indicated by Block 501, and receives shipment/item information/data for one or more shipments/items to be involved in an imminent/upcoming job duty/task, as indicated by Block 502. The location information/data and the shipment/item information/data may be received sequentially and/or simultaneously. For example, the location information/data may be received (e.g., from a handheld computing entity 120, a shipment/item, and/or the like) in a first data packet (and/or a first transmission of a plurality of data packets) and the shipment/item information/data may be received in a second data packet (and/or a second transmission of a plurality of data packets) received after the first data packet. Alternatively, the location information/data and the shipment/item information/data may be received during a single data packet (and/or a single transmission of a plurality of data packets).

In various embodiments, the location information/data and/or the shipment/item information/data may be received from one or more computing entities, such as one or more handheld computing entities 120 utilized to scan a shipment/item, one or more vehicles 125, one or more shipments/items 10 themselves, and/or the like. For example, when transmitting information/data corresponding to a particular shipment/item 10, the computing entity transmitting the information/data may additionally transmit location information/data indicative of where the shipment/item 10 was scanned (and/or where the shipment/item 10 was located when the shipment/item 10 transmitted the information/data). In various embodiments, the location information/data may be transmitted to the carrier computing entity 100 in response to a trigger event, for example, after a computing entity scans the shipment/item 10, after the shipment/item 10 enters a predefined area (e.g., a geofenced area surrounding a particular work area), and/or the like.

The location information/data may be provided in reference to the known locations of one or more image capture devices 400, work areas, and/or the like. For example, the location information/data may comprise information/data indicating that one or more job duties are to be performed at a particular work station, within a particular vehicle 125, and/or the like. As just one non-limiting example, the location information/data may indicate that one or more job duties are to be performed at vehicle 1234. However, in various embodiments, the location information/data may comprise GPS coordinates or other specific location information/data that may be correlated with the location of one or more image capture devices 400 and/or known work areas. For example, the location information/data may indicate that a shipment/item 10 was scanned at GPS coordinates 33.787027, −84.387727. The carrier computing entity 100 may then correlate the location information/data with a known location of one or more image capture devices 400 by determining an image capture device 400 having a location closest to the location information/data. For example, based on the foregoing location information/data, the carrier computing entity 100 may determine that the closest image capture device 400 is located at GPS coordinates 33.787027, −84.387644, and accordingly the carrier computing entity 400 may associate the location information/data with the known location of the nearest image capture device 400.

As mentioned, the carrier computing entity 100 also receives shipment/item information/data comprising information/data indicative of various characteristics of a shipment/item 10 to be involved in an imminent/upcoming job duty/task (e.g., lifting the shipment/item, moving the shipment/item, and/or the like), as shown at Block 502. For example, the shipment/item information/data may comprise information/data indicative of a shipment/item identifier (e.g., an alphanumeric string); information/data indicative of one or more shipment/item dimensions, such as a shipment/item weight, length, width, and/or height; information/data indicative of the durability of the shipment/item 10 (e.g., fragile); information/data indicative of the destination of the shipment/item 10; and/or the like. The shipment/item information/data may be received from one or more sources, such as a scanning device utilized by the individual to scan indicia on a shipment/item 10 (e.g., a scanner in association with a handheld computing entity 120), from a Package Level Detail ("PLD") database, and/or the like.

Upon receipt of information/data identifying a particular shipment/item 10, the carrier computing entity 100 may be configured to continue to perform the various functions as discussed herein. Accordingly, the carrier computing entity 100 may be configured to determine that the shipment/item 10 corresponding to the received shipment/item information/data is to be involved in an imminent/upcoming job duty/task. Alternatively, the carrier computing entity 100 may be configured to receive additional information/data indicating that a particular shipment/item 10 is to be involved in an imminent/upcoming job duty/task. For example, the shipment/item information/data received may comprise information/data indicating that the shipment/item 10 is to be involved in an imminent/upcoming job duty/task. The information/data indicating that the shipment/item 10 is to be involved in the imminent/upcoming job duty/task may be stored as a part of the shipment/item information/data, and/or it may be transmitted as metadata corresponding to the shipment/item information/data. For example, a handheld computing entity 120 transmitting location information/data and/or shipment/item information/data to the carrier computing entity 100 may be configured to transmit metadata with the location information/data and/or shipment/item information/data indicating that the shipment/item 10 is to be involved in an imminent/upcoming job duty/task.

As yet another alternative, the carrier computing entity 100 may be configured to determine whether a shipment/item 10 is to be involved in an imminent/upcoming job duty/task based at least in part on the location information/data and/or the shipment/item information/data. For example, upon determining that a particular shipment/item 10 is located at a particular location (e.g., based on the received location information/data), the carrier computing entity 100 may be configured to determine that the shipment/item 10 is to be involved in an imminent/upcoming job duty/task. The location of a shipment/item 10 may be compared against one or more predefined locations, which may be specific to a particular shipment/item 10 (e.g., a delivery location for the shipment/item) and/or general to a plurality of shipments/items 10 (e.g., a sort facility in which preload employees move shipments/items from one location to another).

As a specific example, a predefined location specific to a shipment/item 10 may be defined relative to an intended delivery destination location for the shipment/item 10. The predefined location may be defined as a geofenced area surrounding the intended delivery destination location (e.g., an area having a radius of 500 yards extending away from the destination location). Thus, upon receiving shipment/item information/data corresponding to a shipment/item 10 determined to be within the predefined location relative to the intended delivery destination for the shipment/item 10, the carrier computing entity 100 may be configured to determine that the shipment/item 10 is to be involved in an imminent/upcoming job duty/task.

As yet another specific example, the carrier computing entity 100 may be configured to determine that received shipment/item information/data corresponding to any shipment/item 10 determined to be located within a particular sort location is indicative of a shipment/item 10 that is to be involved in an imminent/upcoming job duty/task. For example, a location may be defined as a geofenced area around a particular work area in a sort location where preload employees move shipments/items 10 from a conveyor belt into vehicles 125. Thus, the carrier computing entity 100 may be configured to determine that any shipment/item information/data received for a shipment/item 10 determined to be within the particular work area is indicative of a shipment/item 10 to be involved in an imminent/upcoming job duty/task.

With reference again to FIG. 5, the shipment/item information/data may be received from the one or more sources (as indicated at Block 502) in response to a trigger event, such as the scanning of a shipment/item 10 by a handheld computing entity 120, the shipment/item entering within a predefined area (e.g., a predefined geofenced area surrounding a particular work area), and/or the like. For example, the shipment/item information/data may be received directly from a handheld computing entity 120 utilized to scan indicia on a shipment/item 10. In various embodiments, the carrier computing entity 100 may receive information/data indicative of a shipment/item identifier (e.g., an alphanumeric string) from the shipment/item 10 and/or from a handheld computing entity 120 utilized to scan the shipment/item 10. Upon receipt of the shipment/item identifier, the carrier computing entity 100 may query the PLD database to retrieve additional shipment/item information/data regarding the shipment/item 10 from the PLD database. For example, the carrier computing entity 100 may query the PLD database to retrieve information/data stored in a record associated with a particular shipment/item identifier. In various embodiments, the carrier computing entity 100 may retrieve all of the information/data associated with the particular shipment/item identifier. However, in certain embodiments, the carrier computing entity 100 may retrieve at least a portion of the information/data associated with the particular shipment/item identifier.

The PLD database may comprise shipment/item information/data corresponding to one or more shipments/items 10 currently handled by the carrier (e.g., while the carrier is transporting the shipment/item between an origin and a destination). In various embodiments, the shipment/item information/data stored within the PLD database may comprise a shipment/item identifier (e.g., an alphanumeric string); information/data indicative of one or more shipment/item dimensions, such as a shipment/item weight, length, width, and/or height; information/data indicative of the durability of the shipment/item (e.g., fragile); information/data indicative of the destination of the shipment/item (e.g., an intended delivery destination location); and/or the like. Example shipment/item information/data is shown in FIGS. 6-8. Moreover, the shipment/item information/data may comprise information/data indicative of a current location of a shipment/item 10, and/or an intended sort location for a shipment/item 10. For example, for shipments/items 10 placed within a shipment/item delivery vehicle 125, the shipment/item information/data may identify a location within the vehicle 125 at which the shipment/item is placed (or is intended to be placed) (e.g., on a particular shelf or portion of a shelf, on a particular portion of the floor of the vehicle 125, and/or the like). The shipment/item information/data may be indicative of an altitude (or height) where the shipment/item 10 is placed, such that the computing entity may determine whether an individual 5 is required to reach up, bend down, or stretch to reach a particular shipment/item 10. As just one non-limiting example, the shipment/item information/data may indicate that a shipment/item 10 is placed on a bottom shelf proximate the rear of the shipment/item delivery vehicle 125, and accordingly the computing entity may be configured to determine that an individual 5 would be required to bend down to pick-up the shipment/item 10 from its current location within the vehicle 125.

Figure 9:
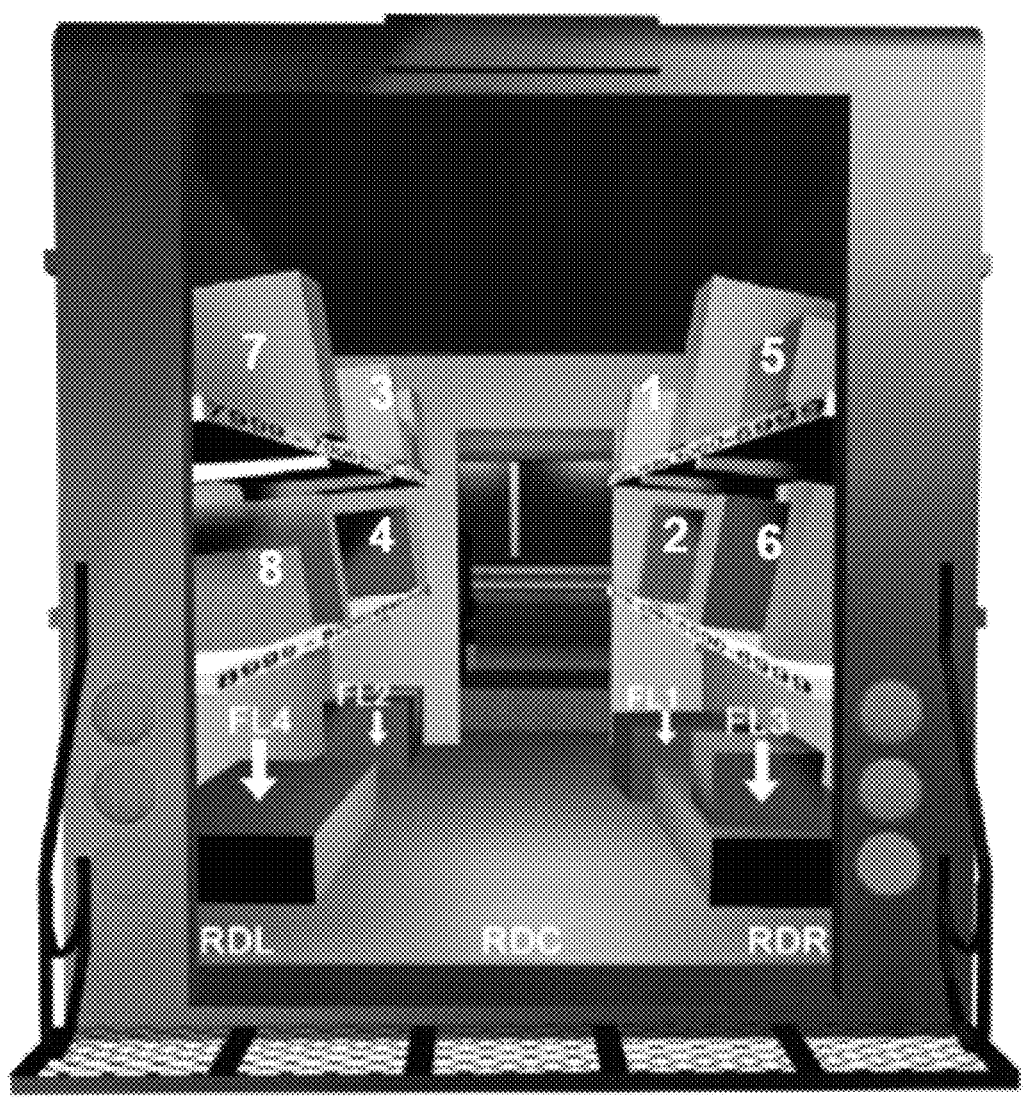
FIG. 9 illustrates example storage location within a vehicle according to various embodiments.

In various embodiments, the shipment/item information/data may comprise information/data indicative of a load/storage position in a vehicle 125 and/or another sort location. FIG. 9 identifies 15 exemplary load/storage positions within a vehicle: 1, 2, 3, 4, 5, 6, 7, 8, FL1 (floor 1), FL2 (floor 2), FL3 (floor 3), FL4 (floor 4), RDL (rear door left), RDC (rear door center), and RDR (rear door right). Load/storage positions may be identified for other storage locations, such as areas within a sort facility, areas within a delivery location (e.g., shelves within a delivery location), and/or the like.

In one embodiment, each load/storage position may be associated with a sequence number. For instance, each shipment/item may be assigned a sequence number between X001-X999 (a number within the sequence range) based upon the load/storage position. For example, for a shipment/item assigned to load/storage position 1 of FIG. 9, the shipment/item may also be assigned a sequence number between 1001-1999 to indicate where on the load/storage position the shipment/item 10 should be placed (e.g., 1538). In an embodiment in which 1500 indicates the midpoint of the shelf (e.g., load/storage position), sequence numbers 1001-1499 may indicate where on the shelf the shipment/item should be placed in relation to the midpoint (how far to the left). Similarly, sequence numbers 1501-1999 may also indicate where on the shelf (e.g., load/storage position) the shipment/item 10 is positioned in relation to the midpoint (how far to the right). The same can occur for each load/storage position by assigning a sequence range and/or a sequence number to each shipment/item 10 that is associated with the corresponding load/storage position: 1001-1999, 2001-2999, 3001-3999, 4001-4999, 5001-5999, 6001-6999, 7001-7999, 8001-8999, FL1001-FL1999, FL2001-FL2999, FL3001-FL3999, FL4001-FL4999, RDL001-RDL999, RDC001-RDC999, and RDR001-RDR999.

In one embodiment, the load/storage position, sequence number, and/or sequence range assigned to each shipment/item 10 can be stored in association with the corresponding shipment/item information/data (see FIG. 13). Based on the information/data identifying the load/storage position for a particular shipment/item 10, the carrier computing entity 100 may determine an altitude (or height) at which a particular shipment/item 10 is currently stored. With reference to FIG. 9, for example, the carrier computing entity 100 may comprise information/data indicative of the relative altitude or height of each of the various shelves as well as data identifying which shelf each shipment/item 10 is located on. Accordingly, based on the data identifying the load/storage position for a shipment/item 10, the carrier computing entity 100 may determine an altitude at which the shipment/item 10 is stored.

In various embodiments, information/data corresponding to a particular shipment/item 10 to be involved in an imminent/upcoming job duty/task may be retrieved from the PLD based on a shipment/item identifier received from a user computing entity 110, a handheld computing entity 120, and/or the like. As previously mentioned, the information/data corresponding to a particular shipment/item 10 may be retrieved from the PLD database in response to a trigger event (e.g., receipt of a shipment/item identifier, receipt of location information/data, and/or the like). For example, a handheld computing entity 120 may transmit information/data indicative of a shipment/item 10 to be retrieved from a cargo area of a vehicle 125 to the carrier computing entity 100, which may retrieve corresponding shipment/item information/data from the PLD database. As yet another example, shipment/item information/data may be received from a handheld computing entity 120 in response to the handheld computing entity 120 scanning a shipment/item identifier.

In various embodiments, the location information/data and the shipment/item information/data (or shipment/item identifier data) may be associated before and/or after transmission to the carrier computing entity 100. For example, the location information/data may be received as metadata corresponding to the shipment/item information/data, based on the identity and/or location of the handheld computing entity 120 transmitting the shipment/item information/data to the carrier computing entity 100. In such embodiments, computing entities (e.g., user computing entities 110, handheld computing entity 120, and/or the like) providing shipment/item information/data to the carrier computing entity 100 may comprise information/data indicative of the current location of the respective computing entity. The stored location information/data indicative of the current location of the computing entity may be provided as user input to the computing entity (e.g., during an initial set-up procedure for the computing entity), may be provided automatically (e.g., an IP address provided by a network), may be determined by a location determining device of the computing entity (e.g., a location sensor), and/or the like. Information/data indicative of the stored current location of the computing entity may be provided to the carrier computing device 100 during transmission of the shipment/item information/data.

Moreover, in various embodiments, the shipment/item information/data may be associated with information/data identifying a particular individual 5, such that the carrier computing entity 100 may associate captured image information/data with a particular individual. For example, individuals may provide identifying information to a computing entity (e.g., a user computing entity 110, handheld computing entity 120, and/or the like) that may capture and/or provide shipment/item information/data to the carrier computing entity 100. In various embodiments, the identifying information may be provided only once, for example, during a sign-in procedure, and may thereafter be associated with all generated, captured, and/or retrieved shipment/item information/data until the individual 5 signs-out of the computing entity. In various embodiments, individuals 5 may be signed out of a computing entity upon receipt of a sign-out trigger event, for example the occurrence of a predefined time period (e.g., 8 hours), upon receipt of sign-in information for a different individuals, upon receipt of a sign-out request, upon receipt of information/data indicating the identifying information has been used to sign-in to a different computing entity, and/or the like.

While a particular individual 5 is associated with a particular computing entity, the identifying information may be associated with the shipment/item information/data (and/or the location information/data) during transmissions of the shipment/item information/data to the carrier computing entity 100. The identifying information may be transmitted as metadata of the shipment/item information/data, such that the carrier computing entity 100 may associate subsequently captured image information/data with particular individual.

Upon receipt of the shipment/item information/data, the central computing entity 100 may be configured to determine whether the shipment/item information/data and/or the location information/data satisfies image information/data collection criteria. As indicated at Block 503 of FIG. 5, the central computing entity 100 may determine whether the received shipment/item information/data and/or the location information/data satisfies image collection criteria indicating that one or more prescribed postures should be utilized to move the shipment/item from its current, expected location. As discussed herein, upon a determination that one or more prescribed postures should be utilized to move the shipment/item, the carrier computing entity 100 may determine that the image information/data collection criteria is satisfied.

In various embodiments, the image information/data collection criteria may identify one or more minimum dimension values for collecting image information/data. For example, the image information/data collection criteria may identify a minimum weight (e.g., 25 lbs.) of shipments/items 10 to be moved during a job duty/task for image information/data to be captured and analyzed. As yet another example, the image information/data collection criteria may indicate various shipment/item storage altitudes (or heights) for satisfying image information/data collection criteria. Following this example, the image information/data collection criteria may indicate that shipments/items 10 stored on low shelves and/or the floor of a vehicle (thus requiring individuals 5 to bend down to pick-up the shipment/item) that are to be removed from their current location during an imminent/upcoming job duty/task satisfy the image information/data collection criteria, while shipments/items 10 placed on higher shelves (such that individuals 5 are not required to bend over to pick-up the shipments/items) do not satisfy image information/data collection criteria.

In various embodiments, the image information/data collection criteria may comprise a plurality of individual criteria that must be satisfied. For example, the image information/data collection criteria may comprise criteria in which shipments/items 10 having at least a minimum weight that are placed at an altitude (or height) requiring an individual 5 to bend down to pick-up the shipment/item 10 satisfies the image information/data collection criteria.

In various embodiments, upon determining that the shipment/item information/data does not satisfies the one or more image information/data collection criteria, the carrier computing entity 100 may continue to monitor for newly received shipment/item information/data, and the process may repeat. Accordingly, the carrier computing entity 100 may not collect image information/data corresponding to the lifting and/or movement of shipments/items 10 that do not pose significant risks of injury to individuals, as determined based on the image information/data collection criteria. Thus, processing resources of the carrier computing entity 100 and/or the one or more image capture devices 400 are not utilized to analyze an individual's posture during job duties that do not pose significant risks of injury.

In various embodiments, upon determining that the shipment/item information/data satisfies one or more image information/data collection criteria, the carrier computing entity 100 activates one or more image capture devices 400 to capture image information/data while individuals perform the job duties including the corresponding shipment/item. The carrier computing entity 100 may utilize the location information/data to identify an appropriate image capture device 400 to activate a particular image capture device 400. As previously noted, each image capture device 400 may be associated with a particular location determinable by the carrier computing entity 100, and the received shipment/item information/data may be associated with location information/data. Accordingly, the carrier computing entity 100 may be configured to activate an image capture device 400 proximate a computing device from which the shipment/item information/data is received to capture image information/data while the corresponding shipment/item 10 is moved, as indicated at Block 504 of FIG. 5. In various embodiments, the carrier computing entity 100 may determine the appropriate image capture device 400 and/or transmit an activation signal to the determined image capture device 400 in real-time. Because the individual 5 moving the shipment/item 10 is unlikely to wait a period of time before completing the imminent/upcoming job duty/task, the carrier computing entity 100 may be configured to (1) determine whether the imminent/upcoming job duty/task warrants collection of image information/data (e.g., satisfies image collection criteria); (2) determine the appropriate image capture device 400 to be utilized to capture image information/data of the individual 5 performing the job duty/task; and (3) transmit a signal to the appropriate image capture device 400 to cause the image capture device 400 to capture image information/data in real-time, such that the image capture device 400 captures relevant images (e.g., still-frame images and/or videos) while the individual performs the job duty/task.

As previously mentioned, activating the image capture device 400 may comprise transmitting an activation signal from the carrier computing entity 100 to the applicable image capture device 400. The activation signal may cause the image capture device 400 to change power states, for example, from a standby state to an active state, and/or to begin capturing image information/data. In various embodiments, the signal transmitted from the carrier computing entity 100 to the image capture device 400 may comprise identifying information/data identifying individuals 5 to be associated with the captured image information/data, such that the image capture device 400 may include the identifying information/data with the captured image information/data while the captured image information/data is transmitted to the carrier computing entity 100. However, in certain embodiments, the carrier computing entity 100 may be configured to associate identifying information/data with the captured image information/data once the captured image information/data is received.

Moreover, activating the image capture device 400 may cause the image capture device 400 to capture one or more still images, one or more videos, and/or the like. The captured image information/data may be transmitted from the image capture device 400 to the carrier computing entity 100 for further analysis.

With reference again to FIG. 5, the carrier computing entity 100 may be configured to query a posture database of reference images upon receipt of the captured image information/data, as indicated at Block 505. As noted herein, the reference images stored in the posture database may each be representative of a proper posture while performing a job duty/task and/or a common improper posture while performing a job duty/task. The posture database may comprise images taken of each of the plurality of individuals 5 employed by the carrier, for example taken during an initial training session for the individual. However, in various embodiments, the posture database may comprise images taken of a subset of the individuals 5 employed by a carrier, and/or of other individuals 5 (e.g., actors) performing various job duties. Particularly in the latter embodiments, the posture database may comprise images of various individuals 5 performing each of the various job duties using various postures, thereby providing several possible matches between captured image information/data and the reference images stored in the posture database. As discussed in greater detail herein, matches between the captured image information/data and the reference images may be based on digital image analysis using fuzzy matching algorithms, and accordingly providing a plurality of reference images of different individuals 5 may provide additional potential points of similarity between the captured image information/data and the reference images in order to provide a better match between the captured image information/data and the reference images.

Moreover, each of the reference images stored in the posture database may be associated with one or more image information/data tags, descriptions, and/or other words used herein providing information/data identifying the content of the respective reference image information/data. For example, the image information/data tags may identify the individual included in the associated image information/data (e.g., by identifying information/data associated with the individual), the job duty/task performed (e.g., lifting a heavy shipment/item 10 from ground-level), whether the reference image illustrates a proper or improper method of performing a job duty/task, and/or the like.

Accordingly, the carrier computing entity 100 may be configured to filter the reference images stored in the posture database according to one or more information/data tags corresponding to the reference images, such that a comparison between the captured image information/data and the reference images is performed only against relevant reference images stored in the posture database. For example, the carrier computing entity 100 may utilize the received shipment/item information/data, location information/data, and/or identifying information/data to determine one or more filters to be applied to the reference images of the posture database. For example, the carrier computing entity 100 may utilize the shipment/item information/data, which identifies various dimensions of the shipment/item 10 and/or the storage altitude of the shipment/item 10 (e.g., while in a shipment/item delivery vehicle 125) to determine appropriate filters to be applied against the reference images of the posture database.

As previously mentioned, the carrier computing entity 100 may be configured to identify shipments/items 10 to be involved in an imminent/upcoming job duty/task based at least in part on the location information/data and/or the shipment/item information/data. The carrier computing entity 100 may also be configured to determine an anticipated type of job duty/task based on the location information/data and/or the shipment/item information/data. In various embodiments, the carrier computing entity 100 may comprise one or more criteria to identify an anticipated type of job duty/task to be performed involving a particular shipment/item 10 based at least in part on the location information/data and/or the shipment/item information/data. The carrier computing entity 100 may comprise a plurality of criteria to identify an anticipated type of job duty/task, wherein one or more of the plurality of criteria may correspond to each of a plurality of possible job duties. The plurality of possible job duties may correspond to possible tags that may be associated with various reference images. Example possible job duties may comprise (1) lift shipment/item from low height; (2) lift shipment/item from high height; (3) carry a heavy shipment/item; (4) carry an oversized shipment/item; and/or the like.

Each of the plurality of possible job duties may correspond with one or more criteria for determining when the job duties are to be performed for a particular shipment/item 10. The criteria may comprise a location-based criteria (e.g., a job duty/task to be performed in a delivery vehicle, a job duty/task to be performed at a sort work area, and/or the like), a shipment/item storage location-based criteria (e.g., stored on a floor, stored on a shelf identified as being less than 12-inches above a floor, stored in a particular load/storage position (e.g., load/storage positions 1, 2, 3, FL1 (floor 1), FL2 (floor 2), FL3 (floor 3), FL4 (floor 4), RDL (rear door left), RDC (rear door center), and RDR (rear door right) as indicated in FIG. 9), a shipment/item dimension-based criteria (e.g., a job duty/task to be performed involving a shipment/item weighing more than 40 pounds), and/or the like. Accordingly, the carrier computing entity 100 may be configured to identify a job duty/task to be performed for a particular shipment/item 10 by comparing location information/data and/or shipment/item information/data against criteria associated with one or more job duties in order to identify a job duty/task to be performed involving the shipment/item 10.

For example, upon determining the shipment/item information/data indicates the shipment/item 10 has one or more dimensions satisfying various thresholds, the carrier computing entity 100 may be configured to apply a filter to the posture database to include only reference images showing an individual 5 lifting heavy and/or bulky shipments/items 10. In various embodiments, multiple filters may be applied to further limit the number of possible reference images against which the captured image information/data is compared. For example, upon determining that the dimensions of a particular shipment/item 10 satisfy various criteria, and upon determining that the particular shipment/item 10 is located on a floor of a delivery vehicle 125, the carrier computing entity 100 may be configured to apply a first filter to show only those reference images showing an individual lifting heavy and/or bulky shipments/items 10, and apply a second filter to show only those reference images showing an individual lifting a shipment/item 10 from the floor of a vehicle 125. The resulting filtered reference images may include only those reference images showing an individual 5 lifting a bulky and/or heavy shipment/item 10 from the floor of a delivery vehicle 125.

As yet another example, the carrier computing entity 100 may be configured to filter the reference images according to the identifying information/data received, such that only reference images corresponding to a particular user are utilized during the comparison.

The carrier computing entity 100 may utilize digital image processing techniques to identify one or more image characteristics shared between the captured image information/data and one or more of the reference images. The comparison between the captured image information/data and the reference images may be performed between the filtered set of reference images and the captured image information/data, or it may be performed between all or substantially all of the reference images stored within the posture database.

In various embodiments, the digital image processing may utilize fuzzy matching logic to identify one or more similarities between the generated image information/data and one or more reference images. The digital image processing may perform a comparison of the captured image information/data and the one or more reference images by identifying one or more shapes, pixels, colors and/or the like in the captured image information/data and the reference images to generate comparison information/data for each of the captured image information/data and the reference images. The digital image processing may then compare the generated comparison information/data of the captured image information/data against the comparison information/data of various reference images to identify matching comparison information/data there between. In various embodiments, the comparison information/data for each of the plurality of reference images may be stored in the posture database.

In certain embodiments, the digital image processing may comprise steps for logically overlying the captured image information/data and each of the reference images (either consecutively and/or simultaneously) to determine a number of pixels, shapes, and/or the like shared between the captured image information/data and each of the reference images. Again, the digital image processing may comprise fuzzy matching logic to identify matches between pixel colors, shapes, and/or the like, such that matches may be identified upon determining at least a portion of the captured image information/data is similar to a particular reference image, defined as within an acceptable tolerance of various aspects of the reference image. As an example, a shape present within both the captured image information/data and a reference image may be determined to match therebetween so long as the size and/or location of the shape of the captured image information/data is within a threshold size and/or distance of the shape of the reference image. Similarly, the color of the shape in the captured image may be determined to be matching if the color of the shape in the captured image is within a tolerance of the color of the shape in the reference image information/data.

A most-similar reference image may be selected based on the quantity (e.g., number of matching comparison data) and/or quality (e.g., highest similarity between various aspects of the comparison data) of matches between the captured image information/data and each of a variety of reference images, as indicated at Block 506. The carrier computing entity may be configured to identify the most-similar reference image as the image having the highest quantity and/or quality of matches between comparison information/data of the captured image information/data and the reference image. However, it should be understood that any of a variety of image comparison methods and/or systems may be utilized to identify a reference image matching the captured image information/data.

In various embodiments in which the captured image information/data and/or the reference images comprise videos, the digital image processing as discussed above may be performed for one or more of frames encompassing the captured image information/data and/or the reference image information/data. A matching reference image may be identified as the most-similar video identified as having the highest quantity and/or quality matching comparison information/data in the highest number of frames. However, as previously mentioned, any of a variety of image comparison methods and/or systems may be utilized to identify a reference image video matching the captured image information/data.

Moreover, in various embodiments, the carrier computing entity 100 may be configured to compare the quantity of matching comparison information/data against one or more match quality criteria to determine whether the determined matching reference image is sufficiently similar to the captured image information/data. For example, the match quality criteria may comprise a threshold number of matches between the comparison information/data of the captured image information/data and a reference image to qualify as an acceptable match. Accordingly, if none of the reference images sufficiently match the captured image information/data to satisfy the match quality criteria, the carrier computing entity 100 may be configured to determine that none of the reference images sufficiently match the captured image information/data.

Referring again to FIG. 5, the carrier computing device 100 may be configured to determine whether the captured image information/data matches a reference image designated as illustrating a correct posture for performing a job duty/task, as indicated at Block 507. Accordingly, the carrier computing device 100 may determine whether any matches have been identified between the captured image information/data and a reference image. If no matches have been identified, the carrier computing device 100 may be configured to determine that the individual 5 did not utilize correct posture in performing the job duty/task reflected in the image information/data. If a match has been established between the captured image information/data and a reference image indicated as illustrating an incorrect posture, the carrier computing device 100 may be configured to determine that the individual 5 did not utilize correct posture in performing the job duty/task reflected in the image information/data. If a match has been established between the captured image information/data and a reference image indicated as illustrating a correct posture for performing a job duty/task, the carrier computing entity 100 may determine that the individual 5 utilized correct posture in performing the job duty/task.

As shown in FIG. 5, if the carrier computing entity 100 determines the individual 5 utilized correct posture, the carrier computing entity 100 may thereafter await receipt of new shipment/item information/data. Moreover, although not shown, in various embodiments the captured image information/data may thereafter be stored in the posture database together with one or more image information/data tags. The image information/data tags to be associated with the captured image information/data may be duplicated from the image information/data tags of the identified matching reference image (e.g., identifying the job duty/task illustrated, whether the job duty/task is performed properly, and/or the identifying information for the user included in the captured image information/data). Accordingly, the captured image information/data may be utilized as a reference image for later-captured image information/data.

Upon determining that the captured image information/data does not match a reference image illustrating proper posture performing a job duty/task, the carrier computing entity 100 may be configured to cause a computing entity (e.g., a user computing entity 110) to generate a report indicative of the improperly performed job duty/task, as indicated at Block 508 of FIG. 5. In various embodiments, carrier computing entity 100 may transmit a signal (e.g., over the network 105) to a separate computing entity (e.g., a user computing entity 110), causing the separate computing entity to activate a report generation software, module, and/or the like. The report generation software may thereafter retrieve information/data indicative of the improperly performed job duty/task for inclusion in the generated report. As just one example, the carrier computing entity 100 may be configured to cause a computing entity associated with a supervisor of the individual 5 to generate the report, such that the individual may take appropriate remedial action as a result of the improperly performed job duty/task. By causing a separate computing entity to generate the report, the processing resources of the carrier computing entity 100 are not utilized to generate the report. Accordingly, the carrier computing entity 100 may be configured to identify an appropriate computing entity to be designated to generate the report. The carrier computing entity 100 may utilize the identifying information/data indicative of the identity of the individual 5 performing the job duty/task to determine an appropriate computing entity to generate the report. For example, the carrier computing entity 100 may be configured to identify a computing entity (e.g., user computing entity 110) associated with the individual's supervisor upon determining the identity of the individual 5 performing the job duty/task. For example, the carrier computing entity 100 may query a database providing information/data regarding each of a plurality of individuals' supervisors, such that the carrier computing entity 100 may determine the appropriate computing entity to generate the report.

However, in various embodiments, the carrier computing entity 100 may generate a report locally, and may transmit the report to one or more computing entities (e.g., user computing entities 110) after generation of the report. For example, the carrier computing entity 100 may be configured to generate and transmit the report to a computing entity associated with the individual 5, with the individual's supervisor, and/or the like.

In various embodiments, the report comprises report information/data comprising information/data indicative of the improperly performed job duty/task. For example, the report information/data may comprise the captured image information/data, a description of the job duty/task performed (e.g., lifting a heavy box from ground level), a description of the proper posture for performing the job duty/task (e.g., maintain a straight back and lift using the muscles of the legs), a reference image illustrating the proper posture for performing a job duty/task, and/or the like.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for analyzing an activity performed by an individual while the individual performs one or more tasks, the system comprising:
   one or more image capture devices;
   a central server in communication with the one or more image capture devices and configured to:
   receive item data for an item indicating the item is to be moved, wherein the item data comprises data indicative of one or more characteristics of the item and the location of the item;
   determine whether the item data satisfies image collection criteria;
   responsive to determining that the item data satisfies the image collection criteria, provide an indication to at least one of the one or more image capture devices to collect image data of an individual performing a job task;
   retrieve one or more reference images identified as reflecting either a proper posture or an improper posture;
   compare one or more images of the collected image data to at least one of the one or more reference images to identify a reference image corresponding to the collected image data;
   responsive to identifying a reference image corresponding to the collected image data, determine whether the identified reference image reflects a proper posture or an improper posture;
   responsive to determining that the identified reference image reflects an improper posture, cause a separate user device to generate a report indicating the individual improperly performed a job task; and
   responsive to determining that the collected image data does not correspond to any of the one or more reference images identified as reflecting a proper posture, cause the separate user device to generate a report indicating the individual improperly performed the job task.

2. The system of claim 1, wherein comparing the collected image data against at least one of the one or more reference images comprises overlying the captured image data and each of the plurality of reference images to identify matching attributes of the captured image data and each of the plurality of reference images.

3. The system of claim 1, wherein provide an indication to one or more of the image capture devices comprises:
   selecting an appropriate image capture device located proximate the location of the item and configured to capture image data of an individual moving the item; and transmitting an activation signal to the appropriate image capture device to cause the image capture device to begin capturing image data.

4. The system of claim 3, wherein the central server is configured to select the appropriate image capture device and to transmit the activation signal to the appropriate image capture device in real time.

5. The system of claim 1, wherein the central server is located geographically remotely from the one or more image capture devices.

6. The system of claim 1, wherein the one or more characteristics of the item comprises data indicative of one or more dimensions of the item.

7. The system of claim 6, wherein the image collection criteria identifies a minimum dimension for the item for capturing image data.

8. The system of claim 7, wherein the minimum dimension is a minimum item weight.

9. The system of claim 1, wherein the item data is received from a handheld computing entity scanning an item identifier associated with the item, and wherein the location of the item is determined based on the location of the handheld computing entity.

10. The system of claim 1, wherein the reference images identified as reflecting a proper posture for performing the job task show proper tools for performing the job task.

11. A computer program product comprising at least one non-transitory computer-readable storage medium having computer-readable program code portions stored therein, the computer-readable program code portions comprising:
an executable portion configured to receive item data for an item indicating the item is to be moved, wherein the item data comprises data indicative of one or more characteristics of the item and the location of the item;
an executable portion configured to determine whether the item data satisfies image collection criteria;
an executable portion configured to, responsive to determining the item data satisfies image collection criteria, provide an indication to at least one of the one or more image capture devices to collect image data of an individual performing a job task;
an executable portion configured to retrieve one or more reference images identified as reflecting either a proper posture or an improper posture;
an executable portion configured to compare one or more images of the collected image data to at least one of the one or more reference images to identify a reference image corresponding to the collected image data;
an executable portion configured to, responsive to identifying a reference image corresponding to the collected image data, determine whether the identified reference image reflects a proper posture or an improper posture;
an executable portion configured to, responsive to determining that the identified reference image reflects an improper posture, cause a separate user device to generate a report indicating the individual improperly performed a job task; and
an executable portion configured to, responsive to determining that the collected image data does not correspond to any of the one or more reference images identified as reflecting a proper posture, cause the separate user device to generate a report indicating the individual improperly performed the job task.

12. A method for analyzing an activity performed by an individual while the individual performs one or more tasks, the method comprising steps for:
receiving item data for an item indicating the item is to be moved, wherein the item data comprises data indicative of one or more characteristics of the item and the location of the item;
determining whether the item data satisfies image collection criteria;
responsive to determining the item data satisfies image collection criteria, provide an indication to at least one of the one or more image capture devices to collect image data of an individual performing a job task;
retrieving one or more reference images identified as reflecting either a proper posture or an improper posture; and
comparing one or more images of the collected image data to at least one of the one or more reference images to identify a reference image corresponding to the collected image data;
responsive to identifying a reference image corresponding to the collected image data, determining whether the identified reference image reflects a proper posture or an improper posture;
responsive to determining that the identified reference image reflects an improper posture, cause a separate user device to generate a report indicating the individual improperly performed a job task; and
responsive to determining that the collected image data does not correspond to any of the one or more reference images identified as reflecting a proper posture, cause the separate user device to generate a report indicating the individual improperly performed the job task.

13. The method of claim 12, wherein comparing the collected image data against at least one of the one or more reference images comprises overlying the captured image data and each of the plurality of reference images to identify matching attributes of the captured image data and each of the plurality of reference images.

14. The method of claim 12, wherein providing an indication to one or more of the image capture devices comprises steps for:
selecting an appropriate image capture device located proximate the location of the item and configured to capture image data of an individual moving the item; and
transmitting an activation signal to the appropriate image capture device to cause the image capture device to begin capturing image data.

15. The method of claim 14, wherein the steps for selecting an appropriate image capture device and for transmitting an activation signal to the appropriate image capture device are performed in real time.

16. The method of claim 12, wherein the one or more characteristics of the item comprises data indicative of one or more dimensions of the item.

17. The method of claim 16, wherein the image collection criteria identifies a minimum dimension for the item for capturing image data.

18. The method of claim 17, wherein the minimum dimension is a minimum item weight.

19. The method of claim 12, wherein receiving the item data comprises steps for:
scanning an item identifier associated with the item via a handheld computing entity;
determining the location of the handheld computing entity; and
associating the determined location of the handheld computing entity with the location of the item.

20. The method of claim 12, wherein the item data is received from a handheld computing entity scanning an item identifier associated with the item, and wherein the location of the item is determined based on the location of the handheld computing entity.

* * * * *